(12) United States Patent
Mishra et al.

(10) Patent No.: US 7,818,327 B2
(45) Date of Patent: Oct. 19, 2010

(54) METHOD AND SYSTEM FOR DETERMINING CONFORMANCE OF A DATA KEY WITH RULES BY MEANS OF MEMORY LOOKUPS

(75) Inventors: Shridhar Mubaraq Mishra, Berkeley, CA (US); Guruprasad Ardhanari, Singapore (SG)

(73) Assignee: Infineon Technologies AG, Munich (DE)

( * ) Notice: Subject to any disclaimer, the term of this patent is extended or adjusted under 35 U.S.C. 154(b) by 1322 days.

(21) Appl. No.: 10/526,700

(22) PCT Filed: Sep. 6, 2002

(86) PCT No.: PCT/SG02/00207

§ 371 (c)(1),
(2), (4) Date: Mar. 4, 2005

(87) PCT Pub. No.: WO2004/023761

PCT Pub. Date: Mar. 18, 2004

(65) Prior Publication Data

US 2005/0262127 A1   Nov. 24, 2005

(51) Int. Cl.
G06F 7/00 (2006.01)
G06F 17/30 (2006.01)

(52) U.S. Cl. .................................... 707/754
(58) Field of Classification Search ........................ None
See application file for complete search history.

(56) References Cited

U.S. PATENT DOCUMENTS 6,778,984 B1 * 8/2004 Lu et al. .................... 707/4

FOREIGN PATENT DOCUMENTS

DE   100 58 443 A1   10/2001
WO   WO 02/15488 A1 * 2/2002

OTHER PUBLICATIONS

Woo, "A Modular Approach to Packet Classification: Algorithms and Results", INFOCOM 3, pp. 1213-1222, Bell Laboratories, 2000.*

* cited by examiner

*Primary Examiner*—Neveen Abel Jalil
*Assistant Examiner*—Michael J Hicks
(74) *Attorney, Agent, or Firm*—Maginot, Moore, Beck

(57) ABSTRACT

A method of comparing unmasked bits of an N-bit data key to an N-bit Rule includes dividing the key into C-bit chunks. Each of the chunks is used as an S address to extract from memories 12, 13, 14, 21, 22, 23, 24, 31, 32, 33, 34, 41, 42, 43, 44. The memory is preprepared, such that the data stored in the address corresponding to that chunk of the key is 1 or O according to whether a bitwise comparison of that chunk of the data key with the mask is equal to a bitwise comparison of that chunk of the mask and rule. This extracted bit therefore indicates whether the rule is obeyed for that chunk of the data key. The N/C extracted bits for each rule are compared, to determine if the rule is obeyed for the entire data key.

21 Claims, 3 Drawing Sheets

METHOD AND SYSTEM FOR DETERMINING CONFORMANCE OF A DATA KEY WITH RULES BY MEANS OF MEMORY LOOKUPS

RELATED APPLICATIONS

The present rule is a group of five patent application having the same priority date. Application PCT/SG02/000211 relates to an switch having an ingress port which is configurable to act either as eight FE (fast Ethernet) ports or as a GE (gigabit Ethernet port). Application PCT/SG02/000210 relates to a parser suitable for use in such as switch. Application PCT/SG02/000207 relates to a flow engine suitable for using the output of the parser to make a comparison with rules. Application PCT/SG02/000209 relates to monitoring bandwidth consumption using the results of a comparison of rules with packets. Application PCT/SG02/000213 relates to a combination of switches arranged as a stack. The respective subjects of the each of the group of applications other than in combination with the technology described in the other four application, but the disclosure of the other applications of the group is incorporated by reference.

FIELD OF THE INVENTION

The present invention relates to methods and systems for determining whether a data key conforms to rules.

BACKGROUND OF INVENTION

Recent advances in Internet technology have changed the way we exchange information. Ubiquitous use of the Internet has led to the idea of convergence, The different types of data (e.g. video, sounds, pictures and text) must traverse the same network, and this has given rise to a plethora of protocols which aim to transmit real time and data traffic on a single network with quality of service support.

Chief among these protocols are DiffServ, IntServ and MPLS, each of which requires packet classification (i.e. determination of the packet's type) in real time when it is received. Packet classification includes the following steps:

The packet is parsed by a parser device to identify bytes of interest (a data key) within the packet. Let us call the number of bits in this data key N.

The data key is compared with M user-defined rules, each rule having a respective priority level, to identify whether the data key obeys any rule, and if so which is the rule of highest priority which is obeyed.

Depending upon the identified rule, action is taken.

The present application is directed to the second of these three steps.

Each rule, labelled by an index I, is represented by an N-bit rule vector. The I-th rule may be written as Rule $[I][N-1:0]$, that is a vector having components which are 0 or 1 and in locations in a range 0 to N-1. For each of the rules there is a corresponding "mask", which is also an N-bit vector of components which are 0 or 1, and is written as Mask $[I][N-1:0]$. The data key is also an N-bit vector of components which are 0 or 1, and is written as KEY $[I][N-1:0]$. The data key KEY is said to match Rule $[I]$ if, for each of the bits for which Mask$[I]$ is equal to 1, Rule $[I]$ is equal to the corresponding bit of the data key. This criterion may be expressed as:

$$\text{Rule}[I] \text{ bitwiseAND Mask } [I] = \text{KEY bitwiseAND Mask } [I] \quad (1)$$

where the operation bitwiseAND compares two N-component vectors and gives an N-component vector having components which are 1 when the corresponding components of both the first two vectors are 1, and otherwise 0.

A simple, known method to detect a rule match would be to store the mask bits in one set of registers, and the rule bits in other registers. Using flip-flop circuits, the data key bits are combined with the mask and rule bits to determine a match by directly verifying whether relationship (1) is true. The number of flip-flops required to implement this scheme will be enormous when the number of rules is high.

SUMMARY OF THE INVENTION

The present invention aims to provide new and useful methods and systems for comparing data keys with rules.

In general terms, the present invention proposes that a data key (of N bits) is divided into chunks (of C bits each), and that each of the chunks is used to extract from a memory the data stored at an address of the memory corresponding to that chunk of the key. The memory is preprepared, such that the data stored in the address corresponding to that chunk of the key is 1 or 0 according to whether a bitwise comparison of that chunk of the data key with the mask is equal to a bitwise comparison of that chunk of the mask and rule. This extracted bit therefore indicates whether the rule is obeyed for that chunk of the data key. The N/C extracted bits for each rule are compared, to determine if the rule is obeyed for the entire data key. The operation is carried out for each of the rules.

Thus, the present invention permits a key to be effectively compared with a rule, with the compare operations largely replaced by look-up operations, which can be implemented cheaply in hardware.

Preferably, the memory is arranged as a RAM structure having a chunk for each of the chunks of the data key. Each chunk of the memory has a two dimensional structure in which a first ("vertical") direction labels possible values of the chunk of the data key, and a second ("horizontal") direction of the memory labels the rule. Thus, when the key is to be compared with a given rule, data is extracted from the column corresponding to the rule and specifically from the location having an address within that column corresponding to the value of that chunk of the data key.

The comparison of the (N/C) extracted bits is preferably performed in two steps. For this purpose, the chunks are preferably grouped into "sections" of L chunks (the number of such sections is N/CL). In a first step, the L extracted bits of each section are compared (e.g. to see if they are all one). In a second step, the N/CL results of the comparison are compared for different sections.

The memory is preferably partition in the "vertical" direction in the same way as the sections. The different seconds of the rule are then tested using different sections of the memory.

The rules are preferably grouped, and the sections of memory are also preferably partitioned in the "horizontal" direction, to give memory "blocks". Each block of the memory (i.e. the memory required for testing all the rules of the corresponding group for the corresponding section of the data key) is preferably implemented as a respective RAM memory device. This makes it possible to ensure that the number of columns of the data structure in each memory device (i.e. rules in each group), is lower than the number of rows in each memory device (i.e. L times the number of possible values of one chunk of the data key). This is a practical requirement for many memory devices. L determines the latency of the system (number of cycles required to check the key against the rule).

The value of C may be determined according to the desired parameters of the operation.

Note that the amount of memory required is proportional to the number of chunks N/C into which the key is divided, multiplied by the number of possible values of the bits in each chunk of the key $2^C$, multiplied by the number of rules M, i.e. a total memory size of $NM2^C/C$. Thus, if the key is of a shorter length (i.e. N is smaller) then the total memory requirement to test an equal number of rules M is smaller.

Based on this realisation, in a preferred form of the invention, the same blocks of memory may be reassigned according to the lengths of the key. For example, if a first data key is replaced by a second shorter (longer) data key, then the number of blocks used for testing each chunk of the data key is greater (longer) so that more (fewer) rules can be tested.

The number of bits in the key is preferably $2^K$, and the number of rules $2^R$, for some integers K, R.

BRIEF DESCRIPTION OF THE FIGURES

Preferred features of the invention will now be described, for the sake of illustration only, with reference to the following figures in which.

DETAILED DESCRIPTION OF THE EMBODIMENTS

Figure 1:
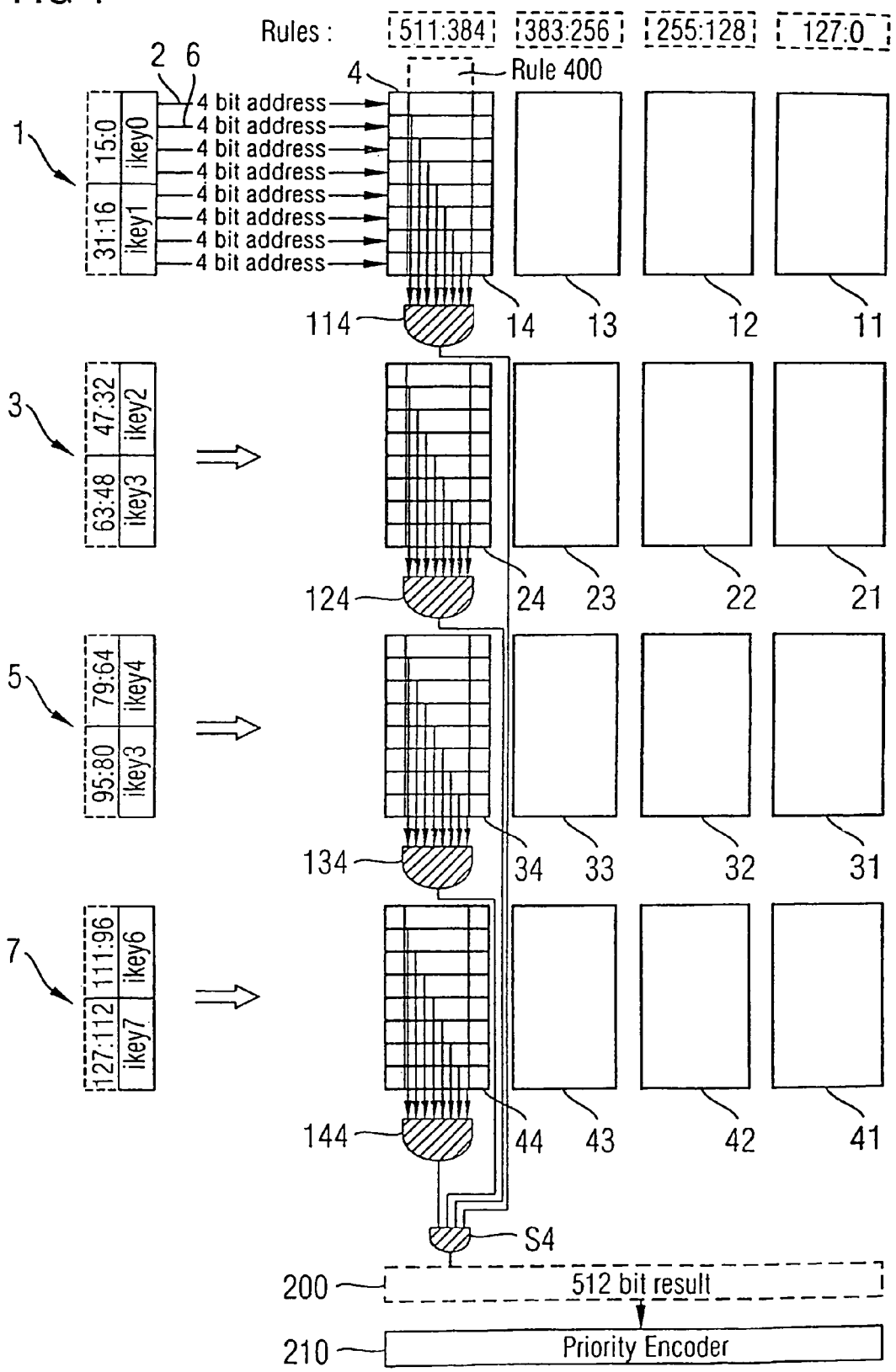
FIG. 1 shows a first embodiment of the invention schematically.

In the first embodiment of the invention shown in FIG. 1, the number of bits N of the KEY is N=128 (i.e. $2^7$). The number of rules is 512 (i.e. $2^9$).

We consider the case of C=4, in which the KEY is divided into 128/4=32 chunks of 4 bits. Thus each chunk can take $2^4=16$ possible values. The value of L is selected to be 8, so that each section is made up of 8 data chunks. The entire key is thus composed of N/CL=4 sections.

The embodiment includes 4 input interfaces 1, 3, 5, 7, which respectively receive (and store in N/4 flip-flops each) one of the 4 sections of the data key: bits 0 to 31; bits 32 to 63; bits 64 to 95; and bits 96 to 127. For example, the first section of the data (bits 0 to 31) is made up of the following 8 chunks of the data key: bits 0 to 3, bits 4 to 7, . . . , bits 28 to 31.

Each of the input interfaces 1, 3, 5, 7 corresponds to four out of 16 RAM memories 11, 12, 13, 14, 21, 22, 23, 24, 31, 32, 33, 34, 41, 42, 43, 44. The input interfaces 1, 3, 5, 7 pass sections of the data key to a selected one of the four corresponding 16 RAM memory devices according to which rule is to be tested. For example, the interface 1 sends the key to memory devices 11, 12, 13 and 14. Each of these memory devices is 128 entries wide, and thus provides the memory locations for 128 rules. This is why, in the embodiment shown 4 memory devices (512 rules/128 rules per memory device gives 4 memory devices) are required to test all the 512 rules for each section of the key. For example, the memory devices 11, 21, 31, 41 test the 4 respective sections of the data key for the rules 0 to 127.

The 4 bits in the first chunk of the data string are used as an address 2, to extract the data stored at this address of the corresponding chunk 4 of the memory. The possible values for each chunk of the data key are 0 to $2^C-1=15$, i.e. 16 possible values, and thus one chunk 4 of the memory is 16 rows high.

When it is desired to check whether a given data key matches a given data key, the sections of the key are transmitted to the memory devices 12, 13, 14, 21, 22, 23, 24, 31, 32, 33, 34, 41, 42, 43, 44 having a column for that rule. For example, as shown in FIG. 1, a determination is being made of whether the key matches rule 400, and for this the four sections of the data key are sent to memory devices 14, 24, 34, 44. Each of the memories treats the section of the data key which it receives as eight separate chunks of the data key, and specifically uses each 4-bit chunk of the key as a 4 bit address, which it uses to extract a corresponding memory item in the table. The bit for each section of the memory is read out in successive cycles. Thus, the memory devices 14, 24, 34, 44 each output eight extracted bits, in eight successive cycles. More generally, the latency of the generation of the L bits is L cycles. Thus, L determines the amount of parallelism in the device, and the required L determines the selection of the other parameters.

The bit stored in the table at an address corresponding to the chunk of the data key, is 1 if the unmasked bits in that chunk of the data key match the unmasked bits in that chunk of the rule (including the case that all bits of that chunk of the key and rule are masked), and 0 otherwise.

Thus, the eight extracted bits from each memory device are all 1 only in the case that, for all eight chunks of the corresponding section, all the unmasked bits of the chunk match the unmasked bits of the respective chunk of the rule.

The eight bits extracted in successive cycles from the each of the four memories 14, 24, 34 and 44 are sent to 4 respective AND gates 114, 124, 134, 144. Actually, each AND gate outputs at the first cycle the bit it receives in that cycle, and performs at each later cycle an AND operation of the bit it receives in that cycle with the bit it outputted in the previous cycle, so that in the eighth cycle it has outputs an AND of all the bits it received. A different AND gate is provided for each rule, but only the one for rule 400 is shown. Also, for each rule twelve corresponding AND gates are provided for each of the other twelve memories, but these are omitted from FIG. 1 for simplicity, since they are unused when a match with rule 400 only is to be determined.

The outputs from the AND gates 114, 124, 134 and 144 (at the eighth cycle) are thus all one only in the case that for all unmasked bits of the data string match the unmasked bits of rule 400. These outputs are transmitted to an AND gate 54, which therefore outputs a 1 if, and only if, the key matches the rule. An AND gate is provided for each rule, but for simplicity only the AND gate 400 for rule 400 is shown. Also, for each rule, three corresponding AND gates for each of the other 3 columns of memories also exist, but these are omitted from FIG. 1 for simplicity, since they are unused when a match with rule 400 only is to be determined.

All the rules are tested successively as described above. Flip-flops 200 are provided for each respective rule, for storing whether a match for that rule is obtained. The matched rule of highest priority is then found by a priority encoder 210.

Let us consider, for example, the case that rule 400 is to test whether the data key indicates that the packet from which the key was derived comes from a given source port. Let us assume that the source port ID corresponds to positions 2 to 7 of the key, and that packet comes from the given source port only if position 2 in the key is 1 and in positions 3 to 7 the key is 0.

In other words, rule 400 and the corresponding mask 400 are shown in Table 1, where X indicates "don't care" (the Rule does not care what the key has in positions outside the source port ID). The "don't case" positions given values 0 in the corresponding mask.

TABLE 1

| | Bit number | | | | | | | | | | | |
|---|---|---|---|---|---|---|---|---|---|---|---|---|
| | 127 | 126 | ... | ... | 7 | 6 | 5 | 4 | 3 | 2 | 1 | 0 |
| Rule 400 | X | X | X | X | 0 | 0 | 0 | 0 | 0 | 1 | X | X |
| Mask 400 | 0 | 0 | 0 | 0 | 1 | 1 | 1 | 1 | 1 | 1 | 0 | 0 |

Thus, the rule will only be obeyed for keys for which bits 0 to 3 are 01XX (i.e. keys for which bits 0 to 3 are any of 0100=4, 0101=5, 0110=6 or 0111=7) and bits 4 to 7 are 0000 (which corresponds to only one address in the corresponding chunk of the memory (i.e. that of bits 16 to 31), that is to bit 16).

Thus, the rule and mask are converted into a 512 bit result vector shown in Table 2:

TABLE 2

| | Bit No | | | | | | | | | | | | | | | |
|---|---|---|---|---|---|---|---|---|---|---|---|---|---|---|---|---|
| | 511-32 | 31 | 30 | 29 | 28 | 27 | 26 | 25 | 24 | 23 | 22 | 21 | 20 | 19 | 18 | 17 | 16 |
| Value | 1 | 0 | 0 | 0 | 0 | 0 | 0 | 0 | 0 | 0 | 0 | 0 | 0 | 0 | 0 | 0 | 1 |

| | Bit No | | | | | | | | | | | | | | | |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| Value | 0 | 0 | 0 | 0 | 0 | 0 | 0 | 0 | 1 | 1 | 1 | 1 | 0 | 0 | 0 | 0 |

This vector is inserted as one column of the memories 14, 24, 34, 44. Thus, when the key is presented, the first output of the memory 14 will be 1 only if the first 4 bits (i.e. first chunk 2) of the key are 01XX. The second output 8 of the memory 14 will be 1 only if the second 4 bits (i.e. second chunk 6) of the key is 0000. All the other outputs of the memory 14 and of all the other memories 24, 34, 44 will always be 1, because the bit corresponding to any possible input address is always 1. The output of the AND gate 54 will therefore be 1 if, and only if, the key shows that the packet comes from source port 1.

More generally, the generation of the vector for insertion into the memory is as follows. We divide the rule and mask into chunks of C bits (a total of N/C chunks). Each chunk has $2^C$ possible states. For each state, this chunk of the key matches the rule in the unmasked bits, or it does not.

Considering the k-th chunk, this corresponds to addresses in the memory of $k2^C+J$, where J ranges from 0 to $2^C-1$. For each J, we set the corresponding bit of the vector for Rule I to be 1 if Rule[I][C bits] AND Mask[I][C bits] is equal to Mask[C bits] AND J, and 0 otherwise.

Note that the number of parallel lookups, which depends on the required latency, is N/(number of bits looked up in L cycles)=N/CL (assuming that it takes one cycle to extract one of the bits from each memory).

The total size of the memory required for each section of the data key is the number of rules M multiplied by $2^C L$. The number of memory devices required for each section of the data key, assuming that each of the memory devices must have a number of columns less than the number of rows, is therefore:

$$M/(2^C L). \quad (2)$$

Each of these memories is $(2^C L)^2$ is size. Thus the total number of memory devices is:

$$NM/(2^C L^2 C) \quad (3)$$

Taking the case of N=128, M=512 and a latency L of 8 cycles, we obtain the following possibilities:

TABLE 3

| C | N/C | Bits per rule = $2^C$N/C | No of parallel lookups N/CL | Number and size of physical memories | Total memory size |
|---|---|---|---|---|---|
| 2 | 64 | 256 | 8 | 128 × (32 × 32) | 128 kbits |
| 4 | 32 | 512 | 4 | 16 × (128 × 128) | 256 kbits |
| 8 | 16 | 1024 | 2 | 2 × (512 × 512) | 512 kbits |

Note that it is also possible within the scope of the invention to operate the embodiments with C=1.

Note that for a fixed amount of memory, the number of keys which can be tested by the above method varies depending on the value of N. The optimal size of the key differs for different typical applications of the method as follows:

TABLE 4

| Typical Key | Optimal Size of key (bits) |
|---|---|
| MAC address | 48 |
| VLAN | 12 |
| Source/Destination IP address | 32 |
| Source/Destination TCP ports numbers | 16 |
| DSCP | 6 |
| RSVP (Src IP Address, Dect IP address, Src TCP Port ID, Dest TCP Port ID, Protocol ID field in IP | 96 |

From (1) and (2) it can be seen that, for given C and L, changes in the value of M and N (such that their product is still $2^{(K+\tilde{K})}$) only changes the configuration of the memory matrix. For this reason the embodiment preferably includes a switching system (not shown, for simplicity) for changing over the connections to the RAM memory devices.

For C=4, L=8 and MN=$2^{16}$ we obtain the following possibilities:

TABLE 5

| M | N | Matrix Rows | Matrix Columns |
|---|---|---|---|
| 512 | 128 | 4 | 4 |
| 1024 | 64 | 2 | 8 |
| 2048 | 32 | 1 | 16 |

Furthermore, key sizes which are not a power of 2 (but greater than CL), and can be expressed as a sum of two multiples of 2 (i.e. $2^{R1}+2^{R2}$ for integers R1 and R2) can be supported, albeit for some wastage of memory. Assuming that $2^{R1}>$CL and $2^{R2}$ is less than or equal to LC, we can obtain that the number of memories (nMEM) required for each $2^{C}$L rules is $(2^{R1}/CL)+(CL/2^{R2})$.

The total number of rules supported M=nMEM($2^{C}$L). In the case C=4, L=8 and MN=$2^{16}$ this gives the following possibilities:

TABLE 6

| N = $2^{R1}$ + $2^{R2}$ | nMEM = $(2^{R1}/CL)$ + $(CL/2^{R2})$ | M |
|---|---|---|
| 96 = $2^6$ + $2^5$ | 3 | 768 |
| 48 = $2^5$ + $2^4$ | 1.5 | 1280 |
| 40 = $2^5$ + $2^3$ | 1.25 | 1536 |

Figure 2:
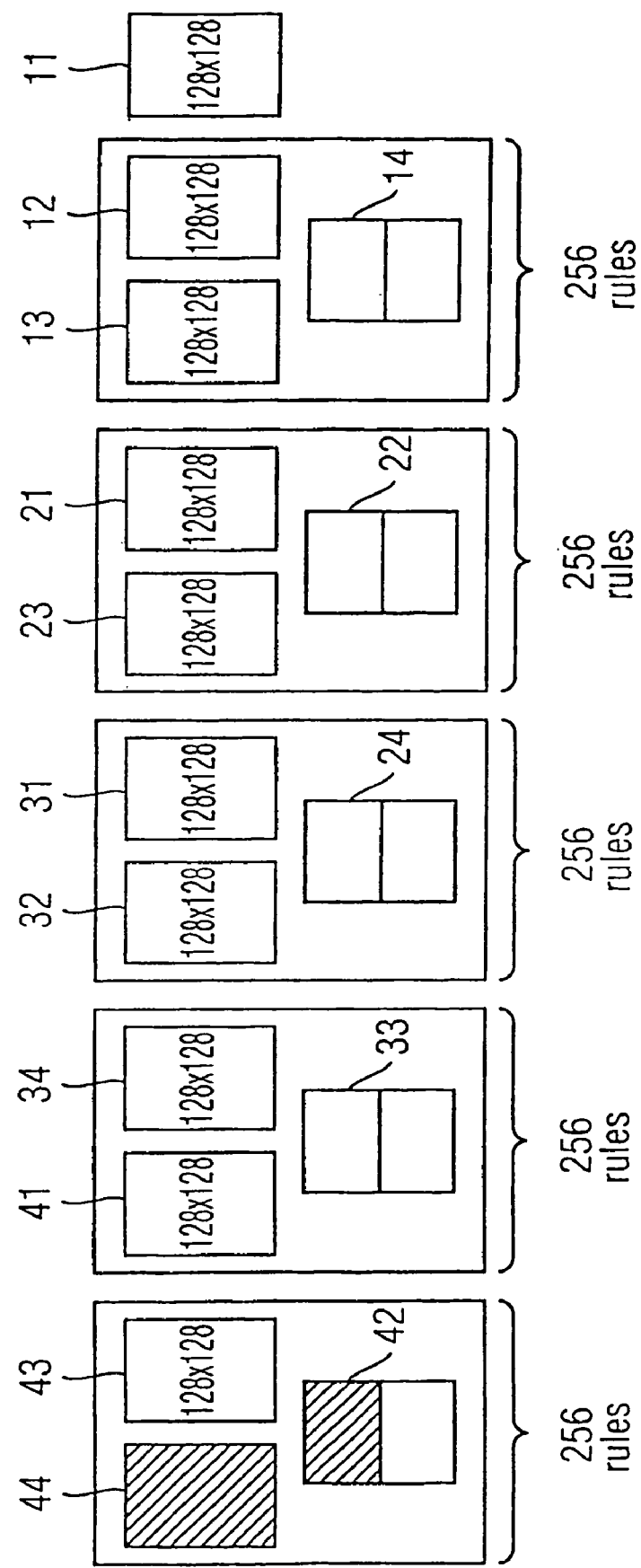
FIG. 2 shows a first modification of the first embodiment.
Figure 3:
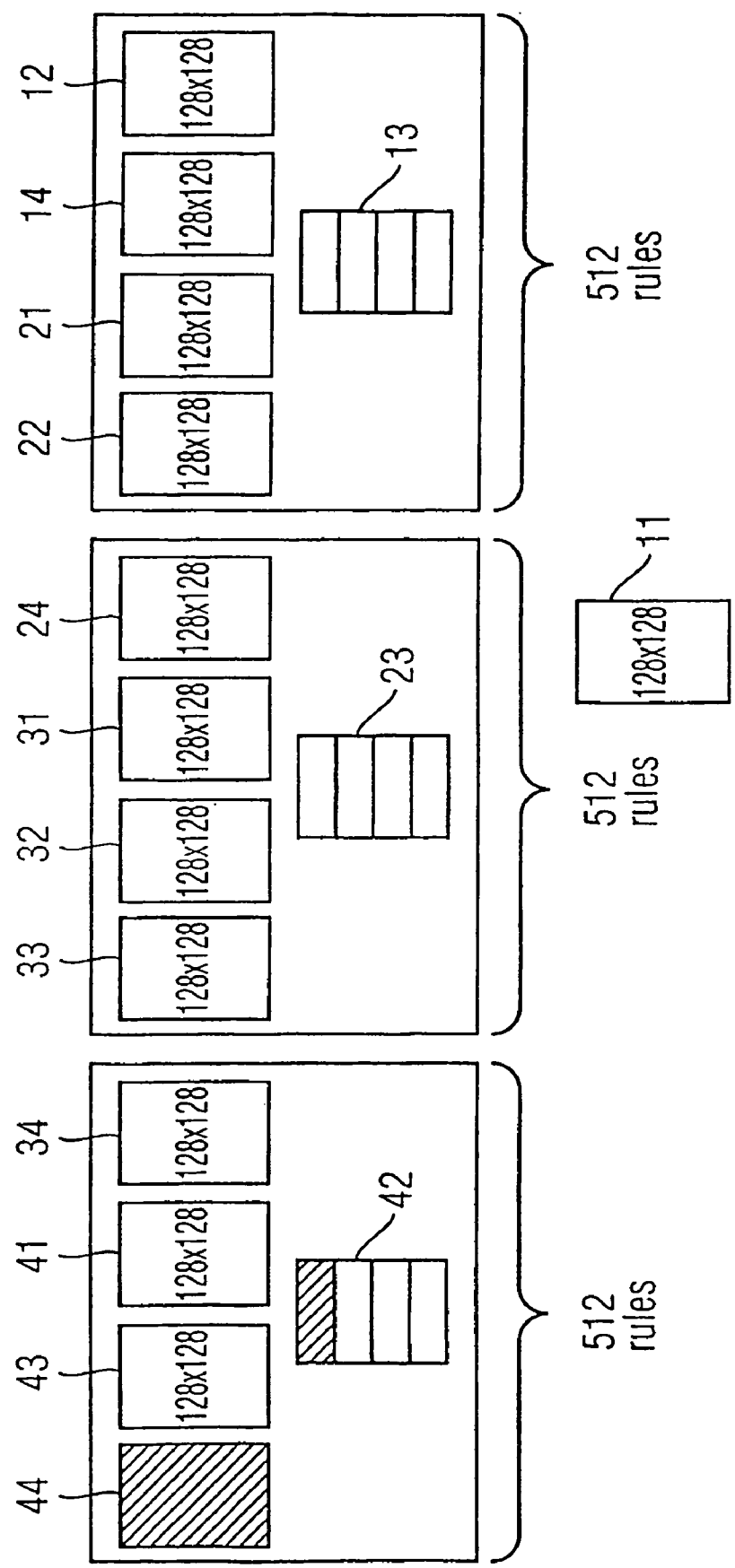
FIG. 3 shows a second modification of the first embodiment.

The second and third of these configurations are shown respectively in FIG. 2 and FIG. 3. The portion of the memory' shaded in each figure is that required for $2^{C}$L=128 rules.

The same 16 memory devices are used in FIGS. 2 and 3 as in FIG. 1. The figures show one particular allocation of these memory devices to the configurations, but any other allocation is also possible. Note that in both configurations one of the memory devices, say memory device 11, is unused and therefore wasted.

Thus, the switching elements vary the effective configuration to make a selectable trade-off between N and M.

Since the number of flip-flops employed in each configuration is N+M (N flip-flops for key storage and M flip-flops to store the rules matched), the number of flip-flops provided must be what is required for the maximum possible value of N+M. For example, when C=4, L=8 and MN=$2^{16}$, this occurs for N=32 and N+M=2080. In all other configurations, only a subset of these flip-flops are required, as shown in the following table:

| N | M | N + M (number of flip-flops required) |
|---|---|---|
| 32 | 2048 | 2080 |
| 40 | 1536 | 1576 |
| 48 | 1280 | 1328 |
| 64 | 1024 | 1088 |
| 128 | 512 | 640 |

The invention claimed is:

1. A method of comparing a data key to a rule, wherein the data key and rule are representable by bits, the method including:
   generating a mask that indicates relevant bits that are relevant to identify the rule and do not care bits that are extraneous for identifying the rule;
   generating a vector comprised of memory positions and at least a corresponding bit for each of the memory positions, by setting bits for those memory positions of the vector pointed to by bits of the rule when read as an address, the address including both relevant bits and do not care bits, to a value that indicates that the rule is detected;
   inserting values of the bits of the vector into memory positions of a memory corresponding to the memory positions for each bit of the vector;
   dividing the bits of the data key into a plurality of chunks;
   extracting data from the memory at an address corresponding to the value of each of at least some of the chunks; and
   examining the data extracted from each memory address corresponding to the at least some of the chunks to determine if the rule is obeyed for the entire data key determining that the rule is a particular rule from among a plurality of rules of one of a plurality of protocols.

2. The method of claim 1, wherein the step of generating a vector comprises automatically setting the value of the corresponding bits of the vector to indicate that the rule is detected according to the following function:

Rule[I][C bits] AND Mask[I][C bits] is equal to Mask[C bits] AND J, wherein I is the Ith rule, C is the number of bits in a chunk, and J ranges from 0 to $2^{C}$-1.

3. The method of claim 2, wherein the step of generating a mask generates a string of bits corresponding to the number of bits in a rule, and sets each bit in the mask that corresponds to a bit in the rule that is relevant for identifying that rule.

4. The method according to claim 1, wherein the step of generating a vector comprises setting the value of bits corresponding to a number of bits comprising a chunk.

5. The method according to claim 1, further comprising the step of configuring the memory into a two dimensional memory structure, a first dimension corresponding to the chunks of the data key and a second dimension corresponding to different rules.

6. The method according to claim 1, wherein examining the data further comprises performing at least one AND operation on the data extracted from the memory corresponding to each of the chunks of the data key to determine if the rule is obeyed for the entire data key.

7. The method according to claim 1, further comprising the step of providing the memory as separate memory devices and allocating sub sets of the different memory devices based on the number of rules to be detected.

8. The method according to claim 1, wherein a number of rules are detected, further comprising the step of prioritizing the rules according to a predetermined order of priority for rules.

9. The method according to claim 1, further comprising the step of parsing for parsing a packet received over a network into a data key.

10. The method according to claim 9, further comprising the step of receiving the packet from an Internet based network.

11. A system for comparing a data key to a rule, wherein the data key and rule are representable by bits, the system including:
   a memory comprised of memory positions and at least a corresponding bit for each of the memory positions making up a vector, wherein bits for those memory positions of the vector pointed to by bits of the rule when read as an address, the address including both relevant bits and do not care bits, are set to a value that indicates that the rule is detected;
   an interface that divides the bits of the data key into a plurality of chunks;
   a comparator that compares data from each memory address corresponding to the at least some of the chunks to determine if the rule is obeyed for the entire data key a processor that determines that the rule is a particular rule from among a plurality of rules of one of a plurality of protocols.

12. The system of claim 11, wherein the memory is populated with the by setting the value of the corresponding bits of the vector stored in memory to indicate that the rule is detected according to the following function:

Rule[I][C bits] AND Mask[I][C bits] is equal to Mask[C bits] AND J, wherein I is the Ith rule, C is the number of bits in a chunk, and J ranges from 0 to $2^C-1$, and wherein Mask are bits set to a value indicating relevant bits that are relevant to identify the rule and do not care bits that are extraneous for identifying the rule.

13. The system of claim 12, further comprising a mask formed of a string of bits corresponding to the number of bits in a rule, and sets each bit in the mask that corresponds to a bit in the rule that is relevant for identifying that rule.

14. The system according to claim 11, wherein the memory stores the value of bits of the vector corresponding to a number of bits comprising a chunk.

15. The system according to claim 11, wherein the memory is configured into a two dimensional memory structure, a first dimension corresponding to the chunks of the data key and a second dimension corresponding to different rules.

16. The system according to claim 11, wherein the comparator includes at least one AND device that operates on data extracted from the memory corresponding to each of the chunks of the data key to determine if the rule is obeyed for the entire data key.

17. The system according to claim 11, wherein the memory is provided as separate memory devices and further comprising a switch that allocates the which memory devices are grouped together based on the number of rules to be detected.

18. The system according to claim 11, wherein a number of rules are detected, further comprising a prioritzer that prioritizes rules according to a predetermined order of priority for rules.

19. The system according to claim 11, further comprising a parser for parsing a packet received over a network into a data key.

20. The system according to claim 19, wherein the parser receives the packet from an Internet based network.

21. The system of claim 11, wherein the memory includes only a number of individual memory units (per bit) according to the formula:

$$NM/(2^C L^2 C),$$

Wherein, N is the number of bits in the data key, M is the number of rules available for detection, C is the number of bits in a chunk and L is the width of a discrete memory device.

* * * * *